US011158271B2

(12) United States Patent
Tsunashima et al.

(10) Patent No.: US 11,158,271 B2
(45) Date of Patent: Oct. 26, 2021

(54) DRIVING METHOD OF DISPLAY DEVICE AND DISPLAY DEVICE

(71) Applicant: Japan Display Inc., Minato-ku (JP)

(72) Inventors: Takanori Tsunashima, Tokyo (JP); Yoshiro Aoki, Tokyo (JP); Makoto Uchida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/030,043

(22) Filed: Jul. 9, 2018

(65) Prior Publication Data

US 2019/0019466 A1 Jan. 17, 2019

(30) Foreign Application Priority Data

Jul. 11, 2017 (JP) ............................ JP2017-135789

(51) Int. Cl.
*G09G 3/36* (2006.01)
*G09G 5/10* (2006.01)
*G02F 1/133* (2006.01)

(52) U.S. Cl.
CPC ......... *G09G 3/3622* (2013.01); *G09G 3/3674* (2013.01); *G09G 3/3685* (2013.01); *G09G 2310/0213* (2013.01); *G09G 2310/0237* (2013.01); *G09G 2320/0626* (2013.01); *G09G 2380/00* (2013.01)

(58) Field of Classification Search
CPC .. G09G 5/00; G09G 5/10; G09G 3/34; G09G 3/36; G02F 1/13357
See application file for complete search history.

(56) References Cited

U.S. PATENT DOCUMENTS

2003/0080932 A1* 5/2003 Konno ................. G09G 3/3648 345/96
2006/0119706 A1* 6/2006 An ......................... G09G 5/393 348/166
2007/0132709 A1* 6/2007 Kawaguchi .......... G09G 3/3406 345/102
2009/0021519 A1* 1/2009 Yusa .................... G09G 3/3688 345/536
2009/0058796 A1* 3/2009 Shingai ................ G09G 3/3666 345/102

(Continued)

FOREIGN PATENT DOCUMENTS

JP 2006-330311 12/2006

*Primary Examiner* — Chanh D Nguyen
*Assistant Examiner* — Nguyen H Truong
(74) *Attorney, Agent, or Firm* — Obion, McClelland, Maier & Neustadt, L.L.P.

(57) ABSTRACT

According to one embodiment, a driving method of a display device including a display area in which liquid crystal pixels are arranged in a matrix, a plurality of scanning lines arranged along display rows, a plurality of signal lines arranged along display columns, a backlight which illuminates the display area, and a controller which controls a display operation, the driving method includes via the controller, driving the scanning lines alternately from a center of the display area to both edges of the display area, outputting video data corresponding to a driven scanning line to the signal lines in synchronization with the driving of the scanning line, and turning on the backlight for a predetermined time after outputting the video data of one frame.

3 Claims, 8 Drawing Sheets

(56) References Cited

U.S. PATENT DOCUMENTS

2009/0303262 A1* 12/2009 Son ...................... G09G 3/3413
345/690
2011/0279486 A1* 11/2011 Kang ................... G09G 3/3406
345/690
2015/0022562 A1* 1/2015 Tsubakino ........... G09G 3/3275
345/690
2016/0293114 A1* 10/2016 Hayashi ............... G09G 3/3607
2016/0379559 A1* 12/2016 Yamaji ................. G09G 3/2096
345/213
2018/0045983 A1* 2/2018 Kim .......................... G02F 1/29
2018/0286315 A1* 10/2018 Zhang .................. G09G 3/3266

* cited by examiner

DRIVING METHOD OF DISPLAY DEVICE AND DISPLAY DEVICE

CROSS-REFERENCE TO RELATED APPLICATIONS

This application is based upon and claims the benefit of priority from Japanese Patent Application No. 2017-135789, filed Jul. 11, 2017, the entire contents of which are incorporated herein by reference.

FIELD

Embodiments described herein relate generally to a driving method of a display device, and a display device.

BACKGROUND

Because of their slimness, lightness and low power consumption, liquid crystal display devices are used as displays for various devices. In particular, active-matrix liquid crystal display devices in which transistors are provided respectively for pixels are widely used as displays for various devices such as television receivers, vehicle-mounted displays such as car navigation systems, notebook computers, tablet computers, mobile phones and mobile devices such as smartphones.

Along with the current development of the application of liquid crystal display devices to various fields, the demand for high-quality display performance has been increasing more than ever before. In particular, regarding the responsiveness of display, since the operation principle of liquid crystal devices relies on the optical shutter operation by basic display elements, that is, liquid crystal molecules, slow response has been a disadvantage of liquid crystal devices as compared to self-luminous devices such as OLEDs which do not involve with any physical operation portion.

On the other hand, new forms of product represented as virtual reality (VR) and augmented reality are spreading rapidly across the current market. In display devices used for these products, in order to exclude negative impacts such as an uncomfortable motion sickness during the use of VR as much as possible, a very high level of responsiveness is particularly required among display qualities. Therefore, liquid crystal display devices have been at a disadvantage to the above-described applications as compared to self-luminous devices.

To improve this disadvantage, a method of applying a voltage whose amplitude is greater than that of a video signal which is actually used for display to each of pixels as an overdrive has been proposed. On the other hand, to improve the visibility of display, a method of controlling the lighting operation of a backlight to shorten the lighting time of the backlight and maintaining the backlight in an off state during the response time of liquid crystal such that the response operation of liquid crystal will not be visually recognized practically, etc., has been proposed.

However, in the case of using an overdrive, an overdrive voltage written to a pixel cannot be adjusted to a predetermined voltage uniformly in a plane in accordance with the lighting of the backlight. Further, even in the case of controlling the lighting of the backlight, as the fineness of a screen improves and the required level of responsiveness increases, the response operation of liquid crystal tends to be more likely to visually recognized during the lighting of the backlight in a pixel to which a voltage is written in the last half of a write operation.

DETAILED DESCRIPTION

Figure 1:
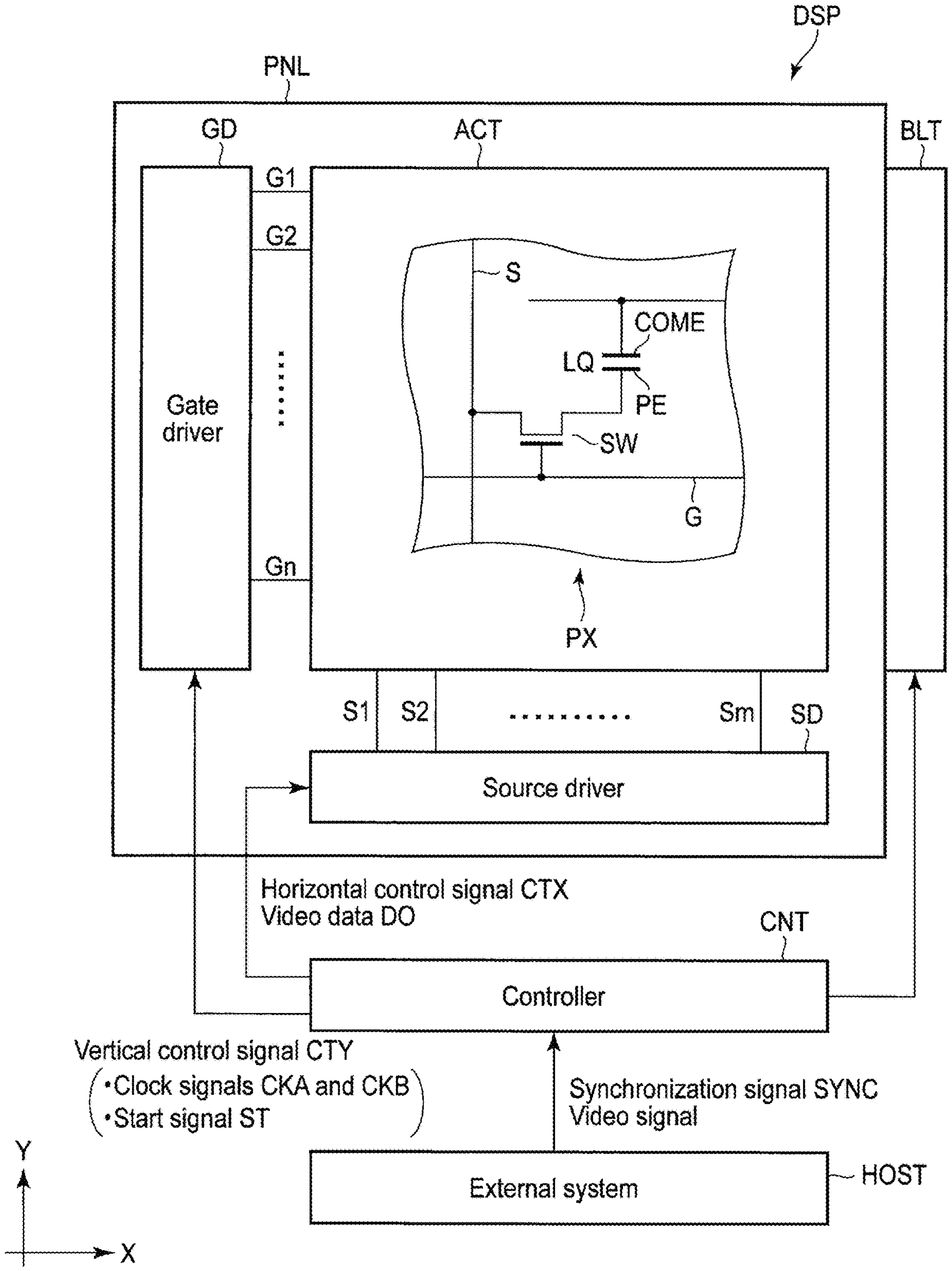
FIG. 1 is an exemplary diagram showing a schematic configuration of a display device of a first embodiment.

Various embodiments will be described hereinafter with reference to the accompanying drawings.

In general, according to one embodiment, a driving method of a display device comprising a display area in which liquid crystal pixels are arranged in a matrix, a plurality of scanning lines arranged along display rows in which the liquid crystal pixels are arranged, a plurality of signal lines arranged along display columns in which the liquid crystal pixels are arranged, a backlight which illuminates the display area, and a controller which controls a display operation, the driving method comprising, via the controller, driving the scanning lines alternately from a center of the display area to both edges of the display area, outputting video data corresponding to a driven scanning line to the signal lines in synchronization with the driving of the scanning line, and turning on the backlight for a predetermined time after outputting the video data of one frame.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed description thereof is omitted unless necessary.

First Embodiment

FIG. 1 is a diagram showing the schematic configuration of a display device DSP of the first embodiment.

The display device DSP comprises a display panel PNL and a backlight BLK which illuminates the display panel PNL from the back surface side of the display panel PNL. The display panel PNL comprises an active area ACT which displays an image. The active area ACT is formed of a plurality of pixels PX arranged in an n-by-m (n rows by m columns) matrix (where m and n are positive integers).

The display panel PNL comprises n scanning lines G (G1 to Gn), m signal lines S (S1 to Sm) and the like in the active area ACT. The scanning lines G are, for example, substantially linearly extend in a first direction X. The scanning lines G are arranged in parallel in a second direction Y intersecting the first direction X. Here, the first direction X and the second direction Y are substantially orthogonal to each other. The signal lines S substantially linearly extend in the second direction Y. The scanning lines G and the signal lines S do not necessarily extend linearly and may be partially crooked.

Each of the scanning lines G is drawn to the outside of the active area ACT and is connected to a gate driver GD. Each of the signal lines S is drawn to the outside of the active area ACT and is connected to a source driver SD. The gate driver GD and the source driver SD are connected to a controller CNT comprising a driver IC chip. The controller CNT drives the gate driver GD and the source driver SD as will be described later but also controls the operation of the backlight BLT.

Each of the pixels PX comprises a switching element SW, a pixel electrode PE, a common electrode COME and the like. The switching element SW is formed of, for example, an n-channel thin-film transistor (TFT). The switching element SW is electrically connected to the scanning line G and the signal line S. The switching element SW may be a top-gate type or may be a bottom-gate type. Further, a semiconductor layer of the switching element SW may be formed of polysilicone, for example, but may be formed of amorphous silicone instead.

The pixel electrode PE is provided in each of the pixels PX and is electrically connected to the switching element SW. The common electrode COME is arranged to be opposed to the pixel electrodes PE of the pixels PX via a liquid crystal layer LQ. The pixel electrode PE and the common electrode COME are formed of light transmissive conductive material such as indium tin oxide (ITO) or indium zinc oxide (IZO), for example, but may be formed of another metal material such as aluminum instead.

The gate driver GD and the source driver SD are arranged in the peripheral area (frame) of the active area ACT as described above. The gate driver GD sequentially applies an on-state voltage to the scanning lines G, and supplies the on-state voltage to a gate electrode of the switching element SW which is electrically connected to the selected scanning line G. As the on-state voltage is supplied to the gate electrode of the switching element SW, a source electrode and a drain electrode of the switching element SW become electrically conductive with each other. The source driver SD supplies output signals corresponding respectively to the signal lines S. The signal supplied to the signal line S is applied to the corresponding pixel electrode PE via the switching element SW in which the source electrode and the drain electrode are electrically conductive with each other.

The controller CNT generates a vertical control signal CTY for the gate driver GD based on a synchronization signal SYNC which is input from an external system HOST. The controller CNT generates a horizontal control signal CTX for the source driver SD based on the synchronization signal SYNC which is input from the external system HOST.

The controller CNT converts video signals input from the external system HOST to video data DO corresponding respectively to the pixels PX. The content of the input video signals will be described later in detail.

The controller CNT can be configured as a device having a function which includes the function of the gate driver GD and the function of the source driver SD.

The vertical control signal CTY is supplied to the gate driver GD and causes the gate driver GD to perform an operation to sequentially drive the scanning lines G. The horizontal control signal CTX is supplied together with the video data DO to the source driver SD. The horizontal control signal CTX causes the source driver SD to perform an operation to assign the video data DO corresponding to the pixels PX, to the signal lines S on a row-by-row basis.

The gate driver GD and the source driver SD are composed of, for example, shift register circuits which select the scanning lines G and the signal lines S, respectively.

The vertical control signal CTY includes a start signal ST, clock signals CKA and CKB and the like. The start signal ST controls the timing to start the shift register circuit. The clock signals CKA and CKB shift the start signal ST in the shift register circuit. In synchronization with the shifted start signal ST, the gate driver GD supplies the on-state voltage to the selected scanning line G as a drive signal and makes the corresponding switching element SW conductive.

Next, the content of video display failure in conventional VR display devices will be described.

Figure 2:
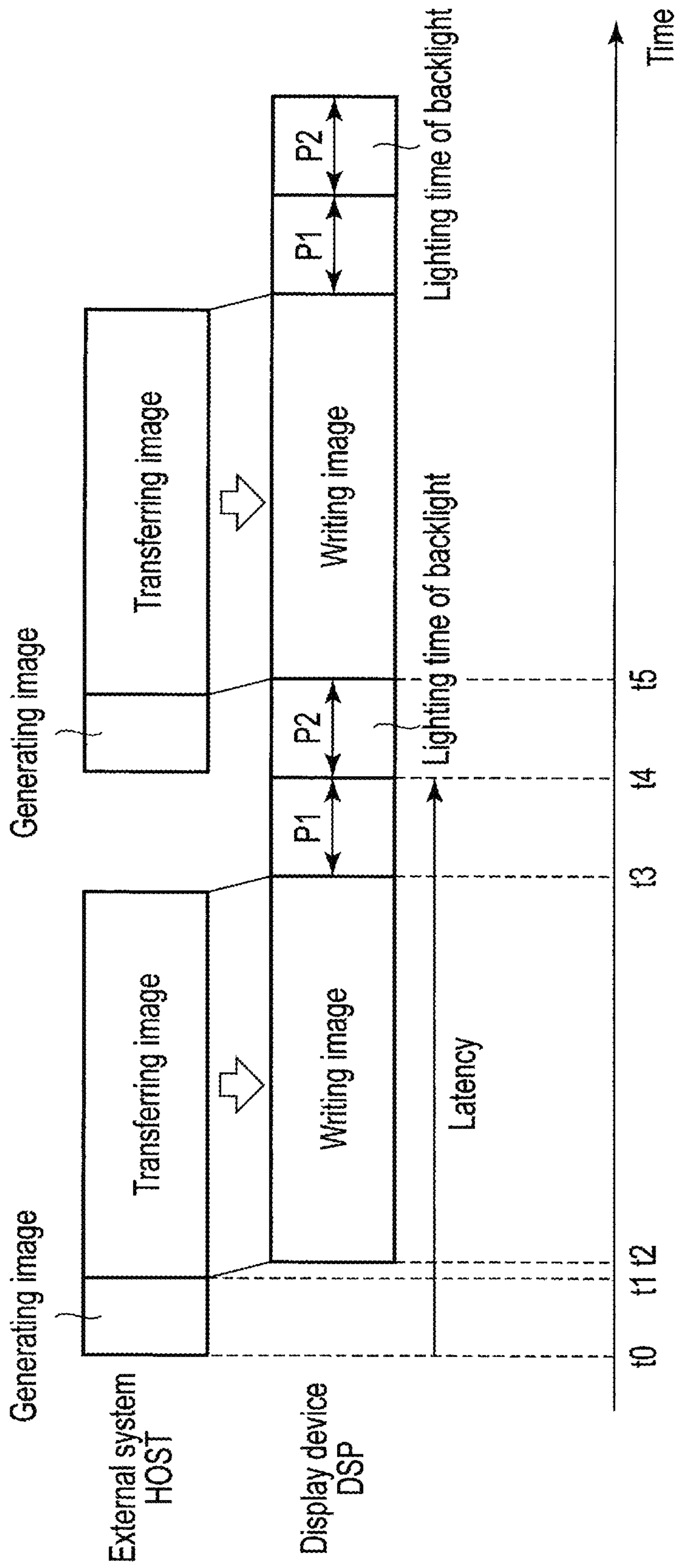
FIG. 2 is an exemplary diagram showing a sequence of operations between an external system and a display device which is studied before an examination of the display device of the first embodiment.

FIG. 2 is a diagram showing a sequence of operations between the external system HOST and the display device DSP which is studied before the examination of the display device DSP of the first embodiment.

At a time t0, the external system HOST starts generating a VR image. At a time t1, the external system HOST starts transmitting video signals of one frame of the generated VR image to the display device DSP display row by display row. The controller CNT converts the signal format of the video signals received in the display device DSP, and starts performing a write operation sequentially on the pixels PX display row by display row at a time t2. Subsequently, the image transmission by the external system HOST and the write operation in the display device DSP will be performed in parallel. At a time t3, the write operation of one frame in the display device DSP ends. At a time t4 after a time P1 has elapsed from the time t3, the backlight BLT is turned on.

During a period P2 from the time t4 at which the backlight BLT is turned on to a time t5 at which the backlight BLT is turned off, the display device DSP starts receiving video signals of the next frame of the VR image display row by display row. At the time t5, the controller CNT turns off the backlight BLT and starts performing the write operation of the video signals of the received next frame display row by display row in the display device DSP.

To perform the operation to receive the video signal from the external system HOST and the operation to convert to and write the video data DO in parallel and in synchronization with each other, the display device DSP may further comprise a buffer memory which temporarily stores the received video signal.

In the sequence of operations shown in FIG. 2, after video data DO for VR is written to all the pixels, the backlight BLT is lit for a predetermined time, and after the backlight BLT is turned off, video data for VR is rewritten to all the pixels. According to this method, as compared to a method of rewriting video data DO while continuously lighting the backlight BLT, a higher-quality video can be displayed. However, a liquid crystal layer requires a transition time in which liquid crystal changes by a pixel potential. Therefore, if video data DO is written to a pixel with timing close to the timing of lighting the backlight BL, transition of liquid crystal may not be sufficient in the pixel, and this will lead to degradation of display quality.

Figure 3:
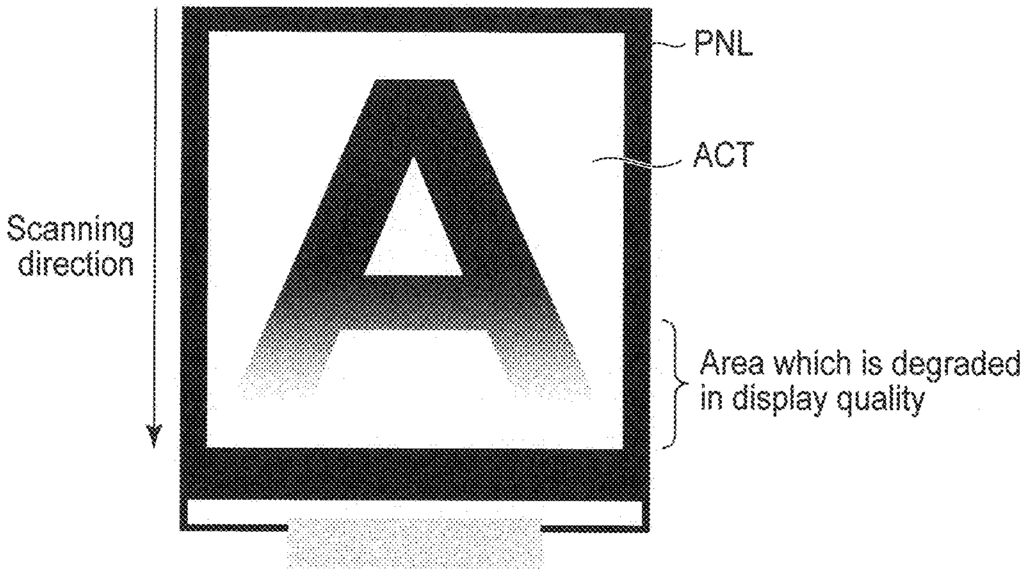
FIG. 3 is an exemplary diagram showing degradation of the display quality of the display device which is studied before the examination of the display device of the first embodiment.

FIG. 3 is an explanatory diagram showing degradation of the display quality of the display device DSP which is studied before the examination of the display device DSP of the first embodiment.

The operation to write the video data DO is sequentially performed from the upper part of the display panel PNL to the lower part of the display panel PNL in a scanning direction shown in the drawing. Therefore, in pixels in the upper part of the display panel PNL, video data DO is written to the pixels early, and thus transition of liquid crystal ends by the time the backlight BLT turns on, but in pixels in the lower part of the display panel PNL, video data DO is written to the pixels later, and thus transition of liquid crystal may not end by the time the backlight BL turns on in some cases. Consequently, the pixels in the lower part of the display panel PNL to which the video data DO is written later will have the image (ghost) of the video of the previous frame which is not rewritten, and the display quality will be degraded.

Usually, in the case of viewing a video displayed on the display panel PNL, the central part of the active area ACT, that is, the display area is an area which is directly opposed to the viewer and is most likely to be viewed. In particular, in the case of viewing a VR image via a head-mounted display, as the sight moves, the active area ACT of the display panel PNL moves, accordingly. That is, the central part of the active area ACT is mainly viewed at all times, and the display of the peripheral part of the active area is less likely to be viewed. Therefore, the display quality of the central part of the active area ACT is important.

Figure 4:
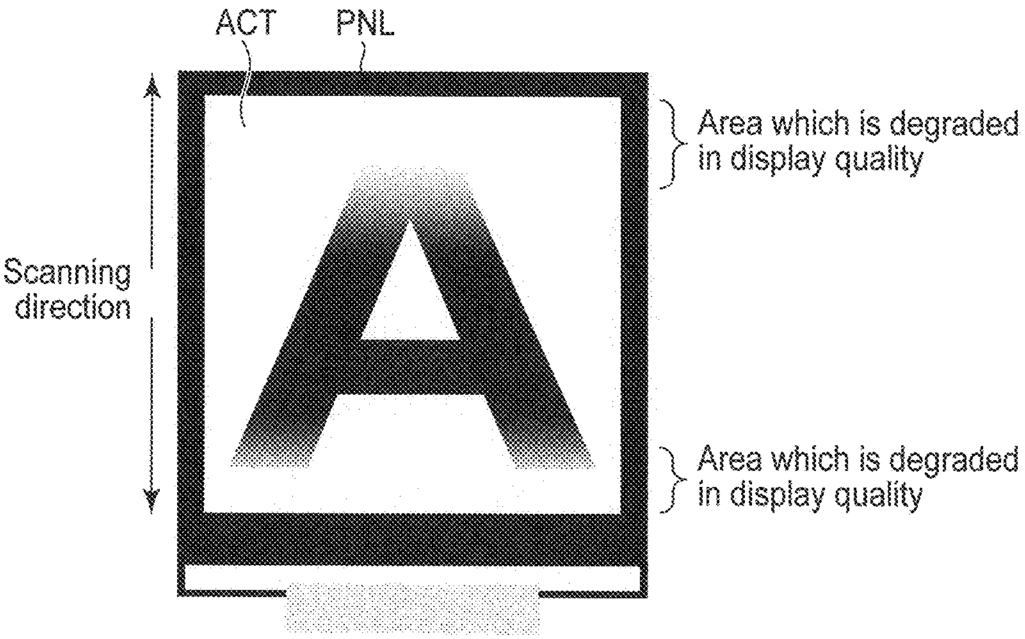
FIG. 4 is an exemplary diagram showing a basic operation of the display device of the first embodiment.

FIG. 4 is a diagram showing the basic operation of the display device DSP of the first embodiment.

In the display device DSP of the first embodiment, the video data DO is written from the center of the active area ACT to both sides (upper edge and lower edge) of the active area ACT. As the video data DO is written in this manner, display quality in actual use can be improved.

Figure 5:
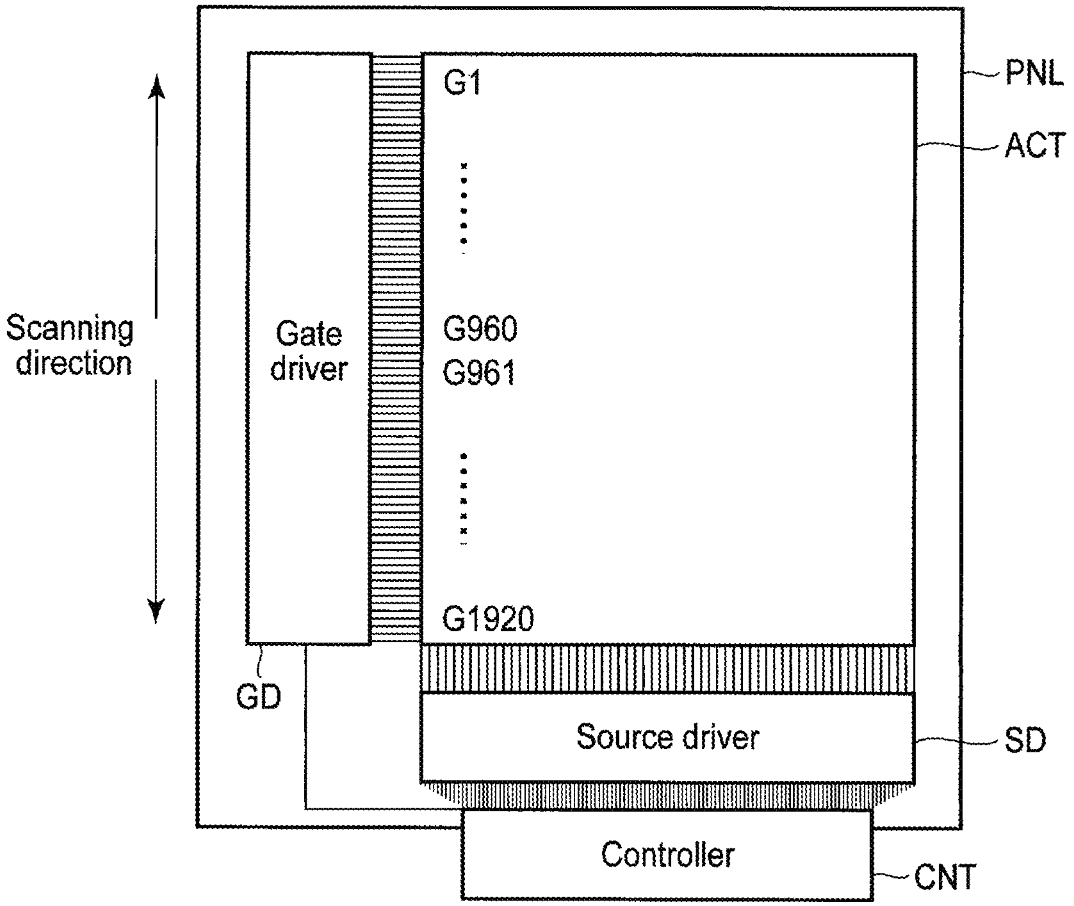
FIG. 5 is an exemplary diagram showing a schematic configuration of the display device of the first embodiment.

FIG. 5 is a diagram showing the schematic configuration of the display device DSP of the first embodiment.

The display device DSP of the first embodiment comprises one source driver SD and one gate driver GD. Therefore, each of the signal line S and the scanning line G is supplied to the active area ACT from one side of the active area ACT. In this configuration, the video data DO is written from the center in the vertical direction of the active area ACT to both sides (upper edge and lower edge) of the active area ACT.

That is, the gate driver GD alternately drives the scanning lines G from the center of the active area ACT to both sides of the active area ACT. The source driver SD outputs, to the signal lines S, video data DO to be displayed in an area (upper area) located in the upper part from the center of the active area ACT and video data DO to be displayed in an area (lower area) located in the lower part from the center of the active area ACT alternately. The controller CNT outputs the start signal ST and the clock signals CKA and CKB for driving the gate driver GD. Further, the controller CNT outputs, to the source driver SD, video data DO in units of display rows corresponding respectively to the scanning lines G to be driven.

The number of scanning lines G provided in the display device DSP is 1920 in total. The scanning lines will be hereinafter expressed as scanning lines G1, . . . , G1920. Accordingly, the scanning lines driven to display an image in the upper area of the active area ACT are the scanning lines G1 to G960, and the scanning lines driven to display an image in the lower area of the active area ACT are the scanning lines G961 to G1920.

Figure 6:
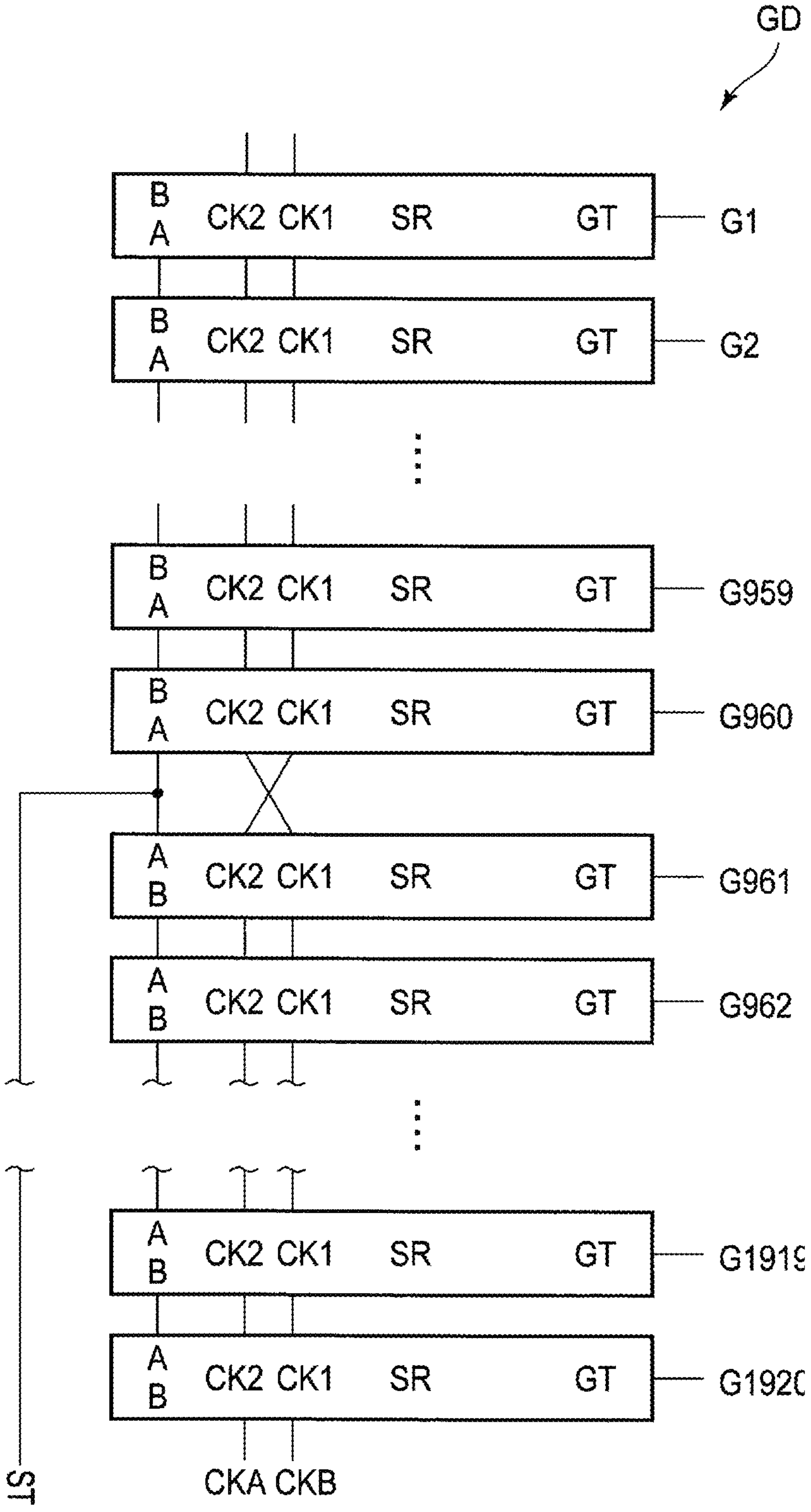
FIG. 6 is an exemplary diagram showing a schematic configuration of a gate driver of the display device of the first embodiment.

FIG. 6 is a diagram showing the schematic configuration of the gate driver GD of the display device DSP of the first embodiment.

The gate driver GD is configured such that a plurality of unit shift registers SR are connected in series (connected in the vertical direction in FIG. 6). The unit shift register SR includes a plurality of input and output terminals. An input terminal A is a terminal to which a transfer pulse output from a unit shift register SR at the previous step is input. An output terminal B is a terminal which outputs a transfer pulse to a unit shift register SR at the subsequent step. Input terminals CK1 and CK2 are terminals to which the clock signals CKA and CKB are input. An output terminal GT is a terminal which is connected to a scanning line G and outputs a drive signal.

The unit shift registers SR connected respectively to the scanning lines G1 to G1920 will be referred to as unit shift registers SR1 to SR1920. The start signal ST output from the controller CNT is input to two unit shift registers at the center, that is, the unit shift register SR960 and the unit shift register SR961. The clock signals CKA and CKB output from the controller CNT are connected to the input terminals CK1 and CK2 of the unit shift registers SR1 to SR960 but are inversely connected to the input terminals CK2 and CK1 of the unit shift registers SR961 to SR1920.

A driving method of the display device DSP of the first embodiment will be described with reference to FIGS. 5 and 6.

The controller CNT outputs the start signal ST to the gate driver GD. The start signal ST is input to the input terminals A of the unit shift registers SR960 and SR961. Subsequently, the clock signals CKA and CKB are alternately input. The clock signals CKA, CKB, CKA, CKB, . . . are input. Firstly, although an operation will be described later in detail, a drive signal is output to the scanning line G960 connected to the unit shift register SR960 at a time when the clock signal CKB is set to an H level. At a time when the clock CKA is set to an H level, a drive signal is output to the scanning line G961 connected to the unit shift register SR961. Subsequently, a drive signal is output to the scanning lines G959, G958, . . . , G1 at a time when the clock signal CKB is set to an H level. A drive signal is output to the scanning lines G961, G962, . . . , G1920 at a time when the clock signal CKA is set to an H level.

In synchronization with the scanning line G to be driven, the controller CNT outputs the corresponding video data of one display row to the source driver SD. In synchronization with a time when a drive signal is output to the scanning line G, the source driver SD supplies video data DO corresponding respectively to the signal lines S. Therefore, the controller CNT outputs video data DO to be displayed from the center of the active area ACT to both sides (upper area and lower area) of the active area ACT from the starting time of a frame. That is, the external system HOST supplies video signals corresponding respectively to the sequentially-driven scanning lines G960, G961, G959, G962, G958, . . . to the controller CNT.

Figure 7:
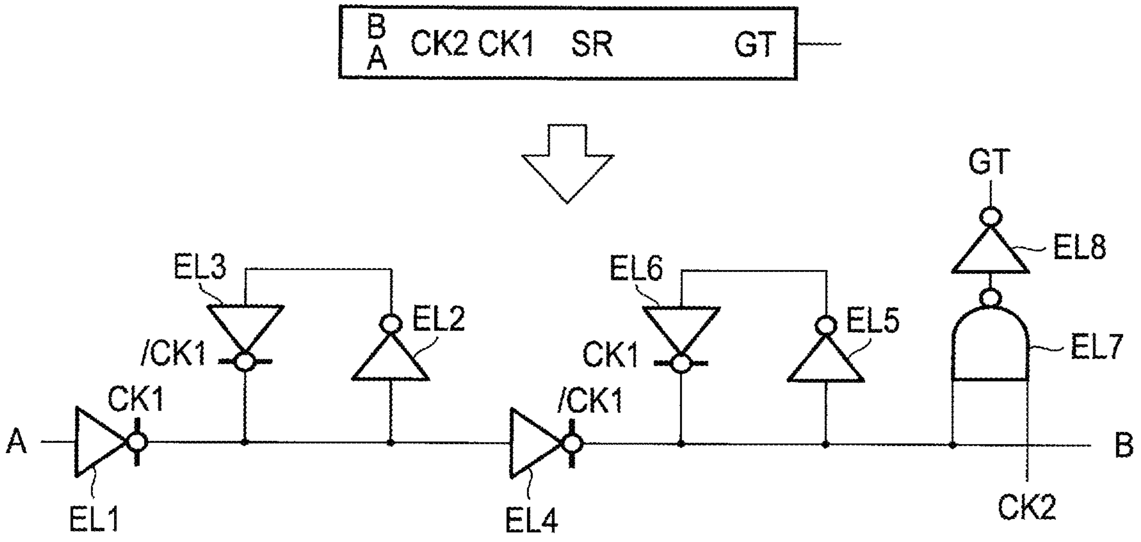
FIG. 7 is an exemplary diagram schematically showing a detailed configuration of a unit shift register of the display device of the first embodiment.

FIG. 7 is a schematic diagram showing the detailed configuration of the circuit of the unit shift register SR of the display device DSP of the first embodiment.

Figure 8:
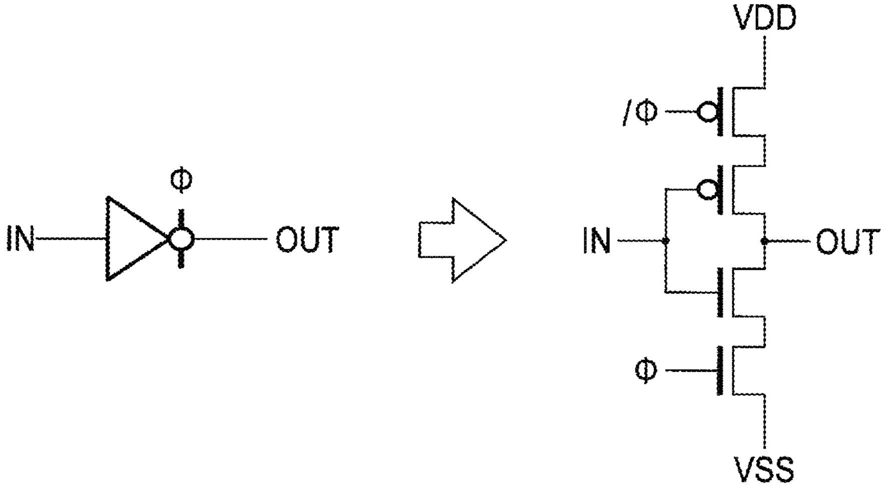
FIG. 8 is an exemplary diagram showing a circuit configuration of a clocked inverter used for a unit shift register.

FIG. 8 is a diagram showing the circuit configuration of a clocked inverter used for the unit shift register SR.

The input terminal A to which the transfer pulse (or start signal) of the shift register is input is connected to the input terminal of a clocked inverter EL1. The clocked inverter is represented as a logic symbol shown on the left side of FIG. 8 and has a circuit configuration shown on the right side of FIG. 8. If φ signal is at an H (high) level, the level of an output signal OUT is the inverted level of an input signal IN. That is, the clocked inverter functions simply as an inverter. On the other hand, if φ signal is at an L (low) level, the output signal OUT is set to a floating state of being cut off from lines which supply power source voltages (VDD and VSS) regardless of the level of the input signal IN.

In the circuit configuration shown in FIG. 7, the output of the clocked inverter EL1 is fed-back via an inverter EL2 and a clocked inverter EL3 which are connected in series, and this constitutes a latch circuit. Further, the output terminal of the clocked inverter EL1 is connected to the input terminal of a clocked inverter EL4. The output of the clocked inverter EL4 is fed-back via an inverter EL5 and a clocked inverter EL6 which are connected in series, and this constitutes a latch circuit. A NAND calculation between the output signal of the clocked inverter EL4 and the clock signal input from the input terminal CK2 is performed via a NAND circuit EL7, and an output of the calculation is output to the output terminal GT to the scanning line G via an inverter EL8. Further, the output of the clocked inverter EL4 is output from the transfer pulse output terminal B.

Figure 9:
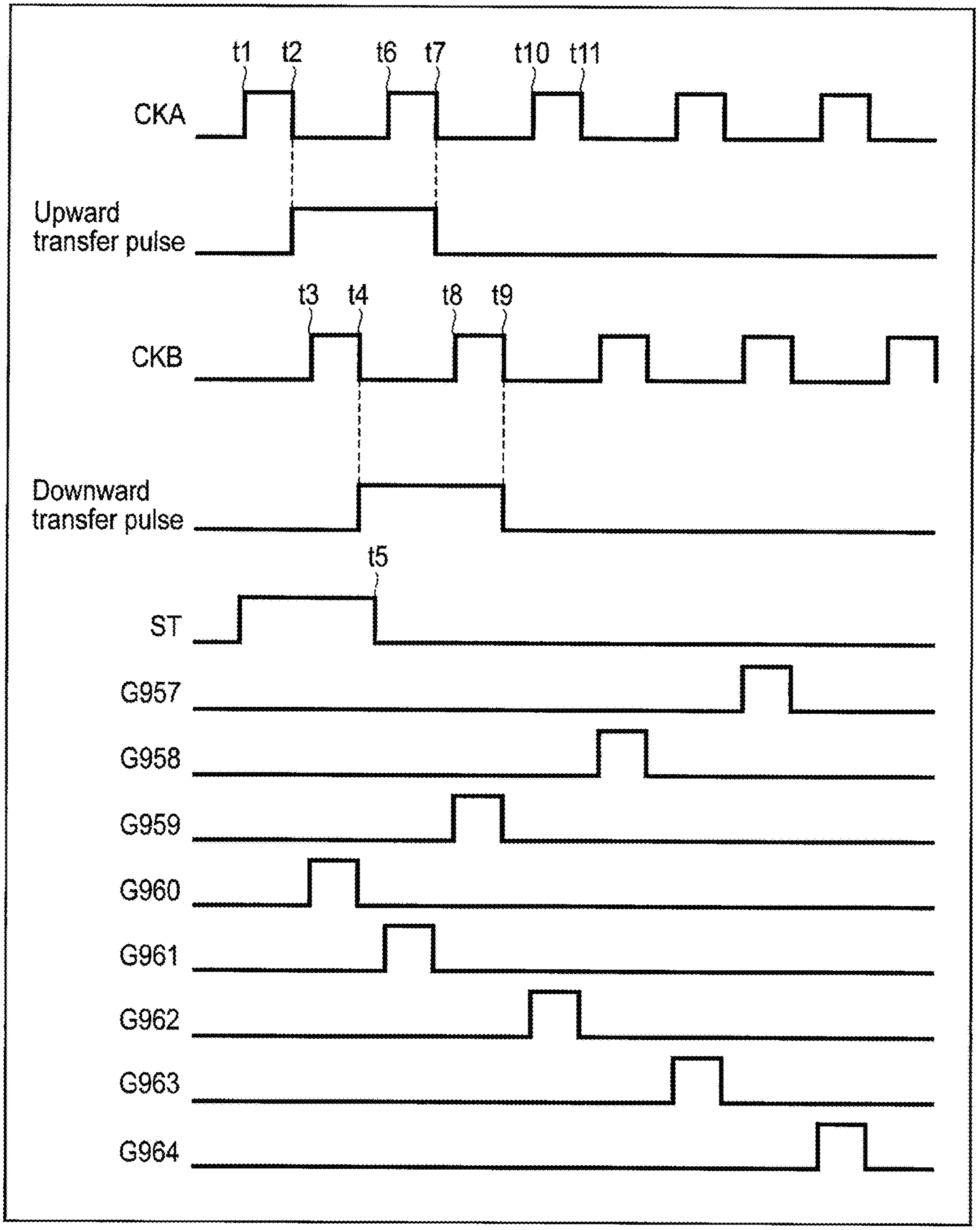
FIG. 9 is an exemplary timing chart showing an operation of the gate driver of the display device of the first embodiment.

FIG. 9 is a timing chart showing the operation of the gate driver GD of the display device DSP of the first embodiment. The operation of the gate driver GD of the display device DSP of the first embodiment will be described with reference to FIGS. 6 to 9.

[Upward Scanning Operation from Center of Active Area ACT]

In the initial state, no signal is input to the input terminals A, CK1 and CK2 of the shift register SR960 connected to the scanning line G960. At a time t1 shown in FIG. 9, the start signal ST and the clock signal CKA rise to an H level, the output of the clocked inverter EL1 of the shift register SR960 is set to an L level.

When the clock signal CKA falls to an L level at a time t2, the clocked inverter EL3 is activated, and the input line of the clocked inverter EL4 is maintained at an L level. Therefore, the output line of the clocked inverter EL4 is set to an H level, and the output terminal B of the shift register SR960 is set to an H level. That is, the transfer pulse to be transmitted in the upper direction is set to an H level.

When the clock signal CKB rises to an H level at a time t3, the input terminal CK2 of the shift register SR960 is set to an H level. Therefore, the output of the NAND circuit EL7 is set to an L level, and the signal level of the scanning line G960 connected to the output terminal GT via the inverter EL8 is set to an H level.

When the clock signal CKB falls to an L level at a time t4, the input terminal CK2 of the shift register SR960 is set to an L level. Therefore, the output of the NAND circuit EL7 is set to an H level, and the signal level of the scanning line G960 connected to the output terminal GT via the inverter EL8 is set to an L level. As a result, a pulse signal which drives the scanning line G960 in synchronization with a pulse signal of the clock signal CKB is generated.

When the start signal ST falls to an L level at a time t5, the input terminal A of the shift register SR960 is set to an L level. At this time, since the input terminal CK1 is at an L level, the clocked inverter EL1 does not operate but remains at the same state.

When the clock signal CKA rises to an H level at a time t6, in the shift register SR960, the clocked inverter EL1 is activated and the output of the clocked inverter EL1 is set to an H level. When the clock signal CKA falls to an L level at a time t7, in the shift register SR960, the output line of the clocked inverter EL4 is set to an L level, and the output terminal B of the shift register SR960 is set to an L level. That is, the transfer pulse to be transmitted in the upper direction is set to an L level. Subsequently, the shift register SR960 remains at the same state until the input terminal A is set to an H level.

On the other hand, when the clock signal CKA rises to an H level at the time t6, the shift register SR959 whose input terminal A is set to an H level by the transfer pulse transmitted in the upper direction starts operating. Subsequently, the operation of the shift register SR959 from the time t6 to a time t9 is the same as the operation of the shift register SR960 from the time t1 to the time t4, and therefore detailed description thereof will be omitted.

As described above, to perform the upward scanning operation from the center of the active area ACT, a pulse signal which sequentially drives the scanning lines G960, G959, G958, . . . is output in synchronization with the rising and falling timing of the clock signal CKB.

[Downward Scanning Operation from Center of Active Area ACT]

The clock signal CKB is input to the input terminals CK1 of the shift registers SR961, SR962, SR963, . . . , and the clock signal CKA is input to the input terminal CK2 of the shift registers SR961, SR962, SR963, . . . , respectively. This connection relationship is opposite to a connection relationship in which the clock signal CKA is input to the input terminals CK1 of the shift registers SR960, SR959, SR958, . . . , and the clock signal CKB is input to the input terminal CK2 of the shift registers SR960, SR959, SR958, . . . , respectively.

In the initial state, no signal is input to the input terminals A, CK1 and CK2 of the shift register SR961 connected to the scanning line G961. Here, at the time t1 shown in FIG. 9, the start signal ST and the clock signal CKA rise to an H level. However, since the clock signal CKA is input to the input terminal CK2 of the shift register SR961 shown in FIG. 7, the clocked inverter EL1 does not operate, and the shift register SR961 remains at the same state. Also when the clock signal CKA falls to an L level at the time t2, the clocked inverter EL1 does not operate, and the shift register S961 remains at the same state.

When the clock signal CKB rises to an H level at the time t3 shown in FIG. 9, since the start signal ST is already at an H level, the output of the clocked inverter EL1 of the shift register SR961 is set to an L level.

When the clock signal CKB falls to an L level at the time t4, the clocked inverter EL3 is activated, and the input line of the clocked inverter EL4 is maintained at an L level. Therefore, the output line of the clocked inverter EL4 is set to an H level, and the output terminal B of the shift register SR961 is set to an H level. That is, the transfer pulse to be transmitted in the lower direction is set to an H level.

When the start signal falls to an L level at the time t5, the input terminal A of the shift register SR961 is set to an L level. At this time, since the input terminal CK1 is at an L level, the clocked inverter EL1 does not operate but remains at the same state.

When the clock signal CKA rises to an H level at the time t6, the input terminal CK2 of the shift register SR961 is set to an H level. Therefore, the output of the NAND circuit EL7 is set to an L level, and the signal level of the scanning line G961 connected to the output terminal GT via the inverter EL8 is set to an H level.

When the clock signal CKA falls to an L level at the time t7, the input terminal CK2 of the shift register SR961 is set to an L level. Therefore, the output of the NAND circuit EL7 is set to an H level, and the signal level of the scanning line G961 connected to the output terminal GT via the inverter EL8 is set to an L level. As a result, a pulse signal which drives the scanning line G961 in synchronization with a pulse signal of the clock signal CKA is generated.

When the clock signal CKB rises to an H level at the time t8, in the shift register SR961, the clocked inverter EL1 is activated, and the output of the clocked inverter FL1 is set to an H level. When the clock signal CKB falls to an L level at the time t9, in the shift register SR961, the output line of the clocked inverter EL4 is set to an L level, and the output terminal B of the shift register SR961 is set to an L level. That is, the transfer pulse to be transmitted in the lower direction is set to an L level. Subsequently, the shift register SR961 remains at the same state until the input terminal A is set to an H level.

On the other hand, when the clock signal CKB rises to an H level at the time t8, the shift register SR962 whose input terminal A is set to an H level by the transfer pulse transmitted in the lower direction starts operating. Subsequently, the operation of the shift register SR962 from the time t8 to a time t11 is the same as the operation of the shift register SR961 from the time t3 to the time t7, and therefore detailed description thereof will be omitted.

As described above, to perform the downward scanning operation from the center of the active area ACT, a pulse signal which sequentially drives the scanning lines G961, G962, G963, . . . is output in synchronization with the rising and falling timing of the clock signal CKA.

According to the display device DSP of the above-described first embodiment, the scanning lines G can be alternately driven from the center of the active area ACT to both sides (upper edge and lower edge) of the active area ACT. As a result, high image quality can be maintained at the center of the screen, and visibility reduction can be limited. Further, since excellent quality of a display image can be maintained at the center of the screen, the responsiveness of the entire system including the external system HOST and the display device can be improved.

Second Embodiment

The display device DSP of the second embodiment differs from the display device DSP of the first embodiment in that the active area is divided into two active areas and these two active areas are driven by independent drivers, respectively. The same portions as those of the first embodiment are denoted by the same reference numbers, and detailed description thereof will be omitted.

Figure 10:
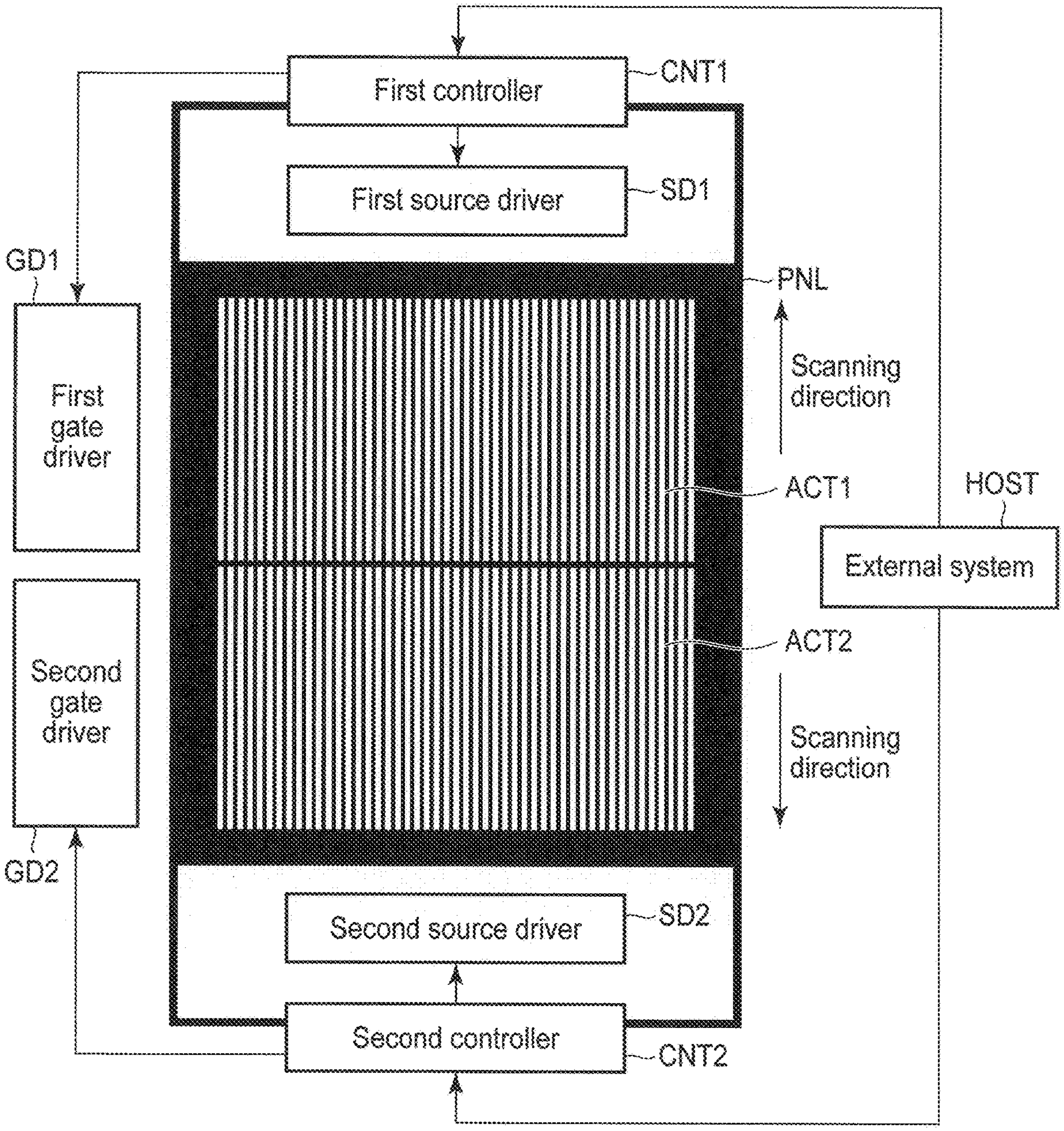
FIG. 10 is an exemplary diagram showing a schematic configuration of a display device of a second embodiment.

FIG. 10 is a diagram showing the schematic configuration of the display device DSP of the second embodiment.

The display device DSP of the second embodiment comprises an active area ACT which is divided at the central part of the display area to both sides (upper side and lower side) of the display area, that is, a first active area ACT1 and a second active area ACT2. Each of the pixels of the first active area ACT1 is driven by a first gate driver GD1 and a first source driver SD1. Each of the pixels of the second active area ACT2 is driven by a second gate driver GD2 and a second source driver SD2. A first controller CNT1 controls the first gate driver GD1 and the first source driver SD1. A second controller CNT2 controls the second gate driver GD2 and the second source driver SD2.

The number of scanning lines G provided in the display device DSP is 1920 in total. The scanning lines will be hereinafter expressed as scanning lines G1, . . . , G1920. Therefore, the scanning lines G1, . . . , G960 are provided in the first active area ACT1, and the scanning lines G961, . . . , G1920 are provided in the second active area ACT2.

The external host HOST supplies video signals corresponding respectively to the scanning lines G960, G961, G959, G962, G958, . . . to the first controller CNT1 and the second controller CNT2. The first controller CNT1 controls the first gate driver GD1 and the first source driver SD1 in such a manner as to write video signals transmitted from the external system HOST and corresponding respectively to the scanning lines G960, G959, G958, . . . sequentially to the first active area ACT1. The second controller CNT2 controls the second gate driver GD2 and the second source driver SD2 in such a manner as to write video signals transmitted from the external system HOST and corresponding respectively to the scanning lines G961, G962, G963, . . . sequentially to the second active area ACT2.

The first controller CNT1 and the second controller CNT2 are provided in the second embodiment, but instead, one controller may receive video signals from the external system HOST and may drive the corresponding drivers.

According to the display device DSP of the above-described second embodiment, the scanning lines G can be driven from the center of the active area ACT to both sides (upper edge and lower edge) of the active area ACT. As a result, high image quality can be maintained at the center of the screen, and visibility reduction can be limited. Further, since excellent quality of a display image can be maintained at the center of the screen, the responsiveness of the entire system including the external system HOST and the display device can be improved.

All display devices which a person having ordinary skill in the art can implement by making appropriate design changes to the display devices described above as the embodiments of the present invention will come within the scope of the present invention as long as they fall within the scope and spirit of the present invention.

Further, a person of ordinary skill in the art can conceive various modifications of the present invention within the scope of the technical concept of the present invention, and such modifications will also come within the scope and spirit of the present invention. For example, a person of ordinary skill in the art may make an appropriate addition, deletion or design change of a constitutional element or may make an appropriate addition, omission or condition change of a manufacturing process to the above-described embodiments, but such modifications will also come within the scope of the present invention as long as they fall within the scope and spirit of the present invention.

Still further, when it comes to advantages other than those described in the above-described embodiments, advantages obvious from the description of the present invention and advantages appropriately conceivable by a person having ordinary skill in the art will be regarded as the advantages achievable from the present invention as a matter of course.

Various aspects of the invention can also be extracted from any appropriate combination of constituent elements disclosed in the above-described embodiments. For example, some of the constituent elements disclosed in the embodiments may be deleted. Further, the constituent elements described across different embodiments may be arbitrarily combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving method of a display device comprising a display area in which liquid crystal pixels are arranged in a matrix, a single gate driver which drives a plurality of scanning lines arranged along display rows in which the liquid crystal pixels are arranged, a single source driver which drives a plurality of signal lines arranged along display columns in which the liquid crystal pixels are arranged, a backlight which illuminates the display area, and a controller which controls a display operation, the driving method comprising:

via the controller, controlling the source driver, the gate driver, and the backlight;

receiving video signals by display row directly from an external system which generates a synchronization signal and a video signal;

converting the video signals of the display row to video data;

driving the scanning lines alternately from a center of the display area to both edges of the display area by controlling the single gate driver;

outputting the video data to the signal lines in an order received from the external system by controlling the single source driver in synchronization with the driving of the scanning line; and turning on the backlight for a predetermined time after transition of liquid crystals of a center area of the display area ends and before transition of liquid crystals of each of a first edge area and a second edge area of the display area ends, after outputting the video data of one frame to the signal lines, and turning off the backlight before outputting the video data of a next frame to the signal lines.

2. The driving method according to claim 1, wherein the video data is for VR.

3. A display device comprising:

a display area in which liquid crystal pixels are arranged in a matrix;

a single gate driver which drives a plurality of scanning lines arranged along display rows in which the liquid crystal pixels are arranged;

a single source driver which outputs video data to a plurality of signal lines arranged along display columns in which the liquid crystal pixels are arranged;

a backlight which illuminates the display area; and a controller which controls a display operation, wherein the controller controls the source driver, the gate driver, and the backlight;

the controller receives video signals by display row directly from an external system which generates a synchronization signal and a video signal, the controller converts the video signals of the display row to video data, the controller controls the single gate driver to alternately drive the scanning lines from a center of the display area to both edges of the display area, the controller controls the single source driver to output the video data to the signal lines in an order received from the external system in synchronization with the driving of the scanning lines, and the controller turns on the backlight for a predetermined time after transition of liquid crystals of a center area of the display area ends and before transition of liquid crystals of each of a first edge area and a second edge area of the display area ends, after outputting the video data of one frame to the signal lines, and turns off the backlight before outputting the video data of a next frame to the signal lines.

* * * * *